United States Patent Office 3,499,877
Patented Mar. 10, 1970

3,499,877
DIMETHYL ALPHA-METHYL STYRENE POLYMERS
Vernon W. Arnold, Hammond, Ind., and Robert J. Lee, Dolton, Ill., assignors to Standard Oil Company, Chicago, Ill., a corporation of Indiana
No Drawing. Filed Sept. 19, 1966, Ser. No. 580,168
Int. Cl. C08f 19/04
U.S. Cl. 260—80.78                                 4 Claims

ABSTRACT OF THE DISCLOSURE

New resin compositions comprise from about 10 to 90 mol percent dimethyl alpha-methyl styrene, about 2 to 72 mol percent alpha-methyl styrene and about 0 to 72 mol percent styrene.

---

This invention relates to resins of dimethyl alpha-methyl styrene with alpha-methyl styrene and with both alpha-methyl styrene and styrene, as well as the preparation of such resins.

The resins of our invention can be produced in a variety of physical forms, ranging from hard resins of over 300° F. ring and ball softening point to low molecular weight products which are viscous liquids at room temperature. We have found that our novel resins having a softening point up to about 350° F. have excellent solubility in a variety of aliphatic and aromatic organic solvents. Certain ratios of monomers give resins which have the proper compatibility with wax and other polymers and copolymers so that these resins are particularly suitable for use in hot melt adhesive compositions and paper coating formulations. These resins can also be used, by routine selection of the proper ratio of components, for dry cleaning sizing purposes and for other applications which will be apparent to those skilled in the art in light of our disclosure of the properties of our resins. The resins of our invention generally have Gardner colors of one or less, which makes them especially suitable for applications requiring colorless or nearly colorless compositions, such as in paper coating compositions.

The resins of our invention can be readily produced by catalytic polymerization of the aforementioned monomers with $BF_3$, $BF_3$ complexes, aluminum chloride, and similar Friedel-Crafts type acidic catalysts. The softening points and molecular weight of the resins can be readily controlled by varying the temperature at which the monomer mixture is contacted with the catalyst and by varying the ratio of catalyst to monomers according to techniques known to the art. Lower temperatures produce resins of higher softening points and higher molecular weights. Higher temperatures produce resins of relatively lower softening points and lower molecular weights. Polymerization is conveniently carried out at a temperature within the range of about 0° C. to −60° C. and in an inert organic solvent.

The monomers used in the production of the resins of our invention are dimethyl alpha-methyl styrene, alpha-methyl styrene and styrene. The copolymer resin of our invention comprises dimethyl alpha-methyl styrene and alpha-methyl styrene, while the terpolymer resins comprise the aforementioned two monomers plus styrene. The dimethyl alpha-methyl styrene isomers useful in our invention are the 2,3-, the 2,4-, the 2,5-, the 2,6-, the 3,4- and the 3,5-dimethyl alpha-methyl styrenes. We have found that the resins made from the 3,4-isomer generally have the best solubility and that this monomer generally can be produced most easily in the highest yields. The 3,5-isomer resins have been found, generally, not to be completely soluble in kerosene and n-heptane, though these have reasonably good solubility in various other organic solvents. The 2,3-, 2,4-, 2,5- and 2,6-isomers are not preferred for the practice of our invention because these isomers are difficult to produce in good yields and high purities. Hence, the 3,4-dimethyl alpha-methyl styrene is the preferred isomer for the practice of our invention. As will be evident to those skilled in the art, a mixture of dimethyl alpha-methyl isomers, containing the 3,4-isomer, can be satisfactorily employed for the practice of our invention. For the purposes of simplicity, our invention will be exemplified hereinbelow with reference to the 3,4-dimethyl alpha-methyl styrene, but it is to be understood that other isomers can be used in the practice of our invention, with the precaution that the 3,5-isomer may lead to resins having less solubility than desirable for some applications. The alpha-methyl styrene and styrene monomers useful in the practice of our invention are well known to those skilled in the art.

The proportions of monomers to be used in the preparation of the copolymer resins of our invention can be varied from 10 mol percent or even less of dimethyl alpha-methyl styrene to as much as 90 mol percent and more with a corresponding amount of alpha-methyl styrene. The preferred ratios are in the range of 25 to 75 mol percent of dimethyl alpha-methyl styrene, with from 75 to 25 mol percent of alpha-methyl styrene. In producing the terpolymers of our invention, we find that about a 1:1:1 mol ratio of the three monomers dimethyl alpha-methyl styrene alpha-methyl styrene and styrene provides useful products. The mixture of monomers may consist of from about 10 to about 90 mol percent dimethyl alpha-methyl styrene with from about 2 to about 72 mol percent alpha-methyl styrene and from about 0 to about 72 mol percent styrene.

The preparation of resins of our invention has been accomplished according to the technique described hereinabove which is set forth in greater detail hereinbelow. Production of our novel resins can be performed in batch or continuous operations, with the continuous process being preferred as a matter of convenience. Various inert organic solvents can be used in the polymerization processes and these provide a ready means for facilitating control of the temperatures and reaction rates of our processes. Among suitable inert organic solvents are those liquid at the temperature of reaction, such as cumene, heptanes, hexanes, toluene, xylene and the like.

PREPARATION OF COPOLYMER RESINS

Copolymerization is preferably carried out in a solution containing about 20 percent by weight of mixed monomers in an inert solvent such as cumene. If the monomers and solvent are not dry, the solution for polymerization can be dried by percolation through calcium chloride or by other means known to the art. The polymerization feed can then be cooled to a desired inlet temperature and pumped into a tube-type reactor, with gaseous $BF_3$ being metered into the feed as it enters the reactor. Solvent and catalyst can be removed from the resin by distillation techniques well known to the art. More specifically, we have found that in the production of a copolymer resin having a softening point in the range 240–250° F., a polymerization temperature of −30 to −60° F. is advantageous when a $BF_3$ catalyst concentration of 0.03 to 0.3 weight percent is used, based on the weight of the total solution.

PREPARATION OF TERPOLYMER RESINS

The terpolymer resins of our invention can be made by a technique similar to that described above for the copolymer resins. We have found that it is desirable, in general, to charge a 20 percent concentration of the monomer mixture in an inert hydrocarbon solvent to a tube reactor at an initial temperature in the range of 0 to −60° F. with from about 0.03 to about 0.3 weight percent of BF$_3$, based on the weight of the total solution.

The physical properties of some copolymer resins made in accordance with our invention are presented in Table 1, along with a comparison to homopolymers. The physical properties of some terpolymer resins made in accordance with our invention are presented in Table 2, along with a comparison with a resin containing only alpha-methyl styrene and styrene.

TABLE 1.—PROPERTIES OF DIMETHYL ALPHA-METHYL STYRENE AND ALPHA-METHYL STYRENE COPOLYMERS AND HOMOPOLYMERS

| Run No | 1 | 2 | 3 | 4 | 5 | 6 |
|---|---|---|---|---|---|---|
| Mol ratio of dimethyl alpha-methylstyrene to alpha-methyl-styrene | 100/0 | 75/25 | 50/50 | 35/65 | 25/75 | 0/100 |
| Softening point, °F. (ring and ball method) | 251 | 253 | 245 | 239 | 263 | 305 |
| Molecular weight | 699 | 711 | 673 | 775 | 769 | 1,054 |

TABLE 2.—PROPERTIES OF DIMETHYL ALPHA-METHYL STYRENE, ALPHA-METHYL STYRENE TERPOLYMERS AND ALPHA-METHYL STYRENE COPOLYMER

| Run No | 7 | 8 | 9 | 10 | 11 | 12 |
|---|---|---|---|---|---|---|
| Mol ratio, DMAMS:AMS:Styrene | 1:1:1 | 1:1:1 | 0.75:1:1 | 0.5:1:1 | 0.25:1:1 | 0:1:1 |
| Softening point, °F | 205 | 244 | 266 | 269 | 280 | 244 |
| Molecular weight | 706 | 911 | 1,138 | 1,219 | 1,419 | 1,139 |

As an example of the utility of the resins of our invention, the following illustrative preparation of a hot melt paper coating formulation is offered. Into a two-liter stainless steel kettle there was added 51.9 parts by weight of 150–152° F. MP paraffin wax. This was heated to 300° F. with agitation by a turbine blade. One-tenth part by weight of butylated hydroxy toluene was added as antioxidant, followed by the slow addition of 30.0 parts by weight of ethylene-vinyl acetate copolymer.

This mixture was held at 300° F. with agitation until the blend became clear and smooth. After the initial 10 to 15 minutes of agitation, the viscosity of the mix began to increase and the agitation rate was lowered to reduce air entrapment. Then 18.0 parts by weight of a dimethyl alpha-methyl styrene and alpha-methyl styrene resin of our invention, containing a ratio of dimethyl alpha-methyl styrene to alpha-methyl styrene of 35:65, were added at 275° F., with continuing agitation until completely in solution. This required about 30 minutes.

Paper coatings were performed using the hot melt formulation prepared as described above and using a similar formulation wherein the dimethyl alpha-methyl styrene/alpha-methyl styrene resin was replaced with vinyl toluene/alpha-methyl styrene, a composition known to this art for such use. The coatings were applied to 7-inch wide, 23 lbs. per sq. ft. glassine paper at a coating weight of 7 to 8 lbs./3000 sq. ft., with the melt tank maintained at 325° F. while the pickup roll and doctor blade were maintained at 310–315° F. Paper coating evaluations were conducted on the two sample coatings and the results are compared in Table 3.

TABLE 3.—PAPER COATING EVALUATIONS

| Test | DMAMS/AMS | Vinyl toluene/AMS |
|---|---|---|
| Pick point, °F. (Tappi T 652) | 109 | 112.5 |
| Block point, °F. (Tappi T 652) | 121 | 129 |
| Seal strength, g./in. (Tappi T 642) | Fiber tear | 52 |
| Gloss, 45°: | | |
|   Initial | 52 | 59 |
|   7-day | 51 | 59 |
| Moisture vapor transmission rate, g./100 in.²/24 hr. at 100° F., 90% R.H.: | | |
|   Flat | 1.54 | 2.27 |
|   Creased | 2.44 | 4.12 |

From the above results it is apparent that the hot melt coating formulation containing dimethyl alpha-methyl styrene/alpha methyl styrene provides improved seal strength and lower moisture vapor transmission as compared to a hot melt coating heretofore known to the art.

In a similar fashion, hot melt adhesives and coating formulations can be made from dimethyl alpha-methyl styrene/alpha-methyl styrene/styrene resins containing monomers in proportions within the scope of our invention, as well as from dimethyl alpha-methyl styrene/alpha-methyl styrene resins within the scope of our invention.

Having thus described our invention, what we claim is:

1. A copolymer comprising from about 10 to about 90 mol percent dimethyl alpha-methyl styrene, from about 2 to about 72 mol percent alpha-methyl styrene and from about 0 to about 72 mol percent styrene.

2. The copolymer of claim 1 wherein the molar ratio of dimethyl alpha-methyl styrene/alpha-methyl styrene/styrene is about 1:1:1.

3. The copolymer of claim 1 wherein the mol percent of dimethyl alpha-methyl styrene is within the range of 10 to 90, the mol percent of alpha-methyl styrene is correspondingly within the range of 90 to 10 and the mol percent of styrene is zero.

4. The copolymer of claim 1 wherein the mol percent of dimethyl alpha-methyl styrene is in the range of 25 to 75, the mol percent of alpha-methyl styrene is correspondingly within the range of 75 to 25 and the mol percent of styrene is zero.

References Cited

UNITED STATES PATENTS 2,269,810  1/1942  Dreisbach et al. _____ 260—88.2
2,645,632  7/1953  Grotenhuis _____ 260—80.6

OTHER REFERENCES

Chemical Abstracts vol. 42:6334e.

JOSEPH L. SCHOFER, Primary Examiner

R. S. BENJAMIN, Assistant Examiner

U.S. Cl. X.R.

260—88.2